May 12, 1931.   C. L. HUNSICKER   1,804,690
OPTOMETRIST INSTRUMENT
Filed Oct. 25, 1926   3 Sheets-Sheet 1

INVENTOR.
Clyde L. Hunsicker
BY
Townsend, Loftin & Abbett
ATTORNEYS.

May 12, 1931.  C. L. HUNSICKER  1,804,690
OPTOMETRIST INSTRUMENT
Filed Oct. 25, 1926    3 Sheets-Sheet 2

INVENTOR.
Clyde L. Hunsicker
BY
Townsend, Loftus & Abbett
ATTORNEYS.

May 12, 1931.　　C. L. HUNSICKER　　1,804,690
OPTOMETRIST INSTRUMENT
Filed Oct. 25, 1926　　3 Sheets-Sheet 3
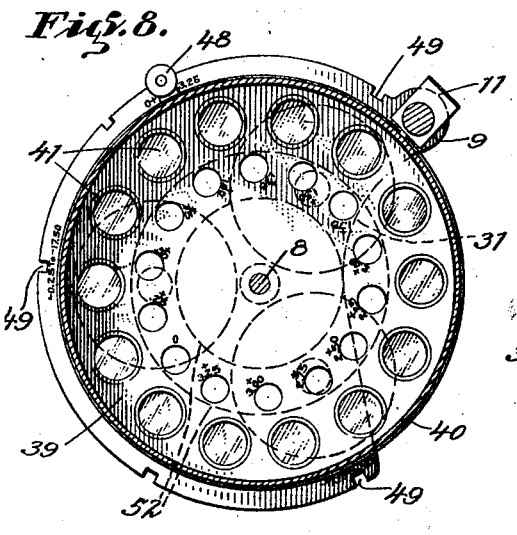
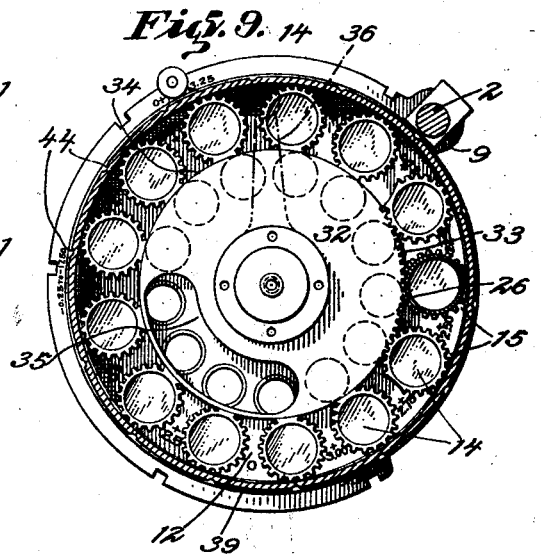
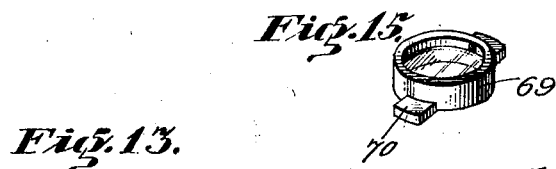
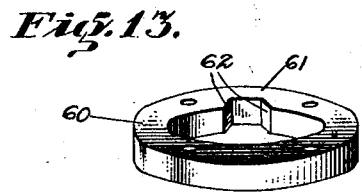
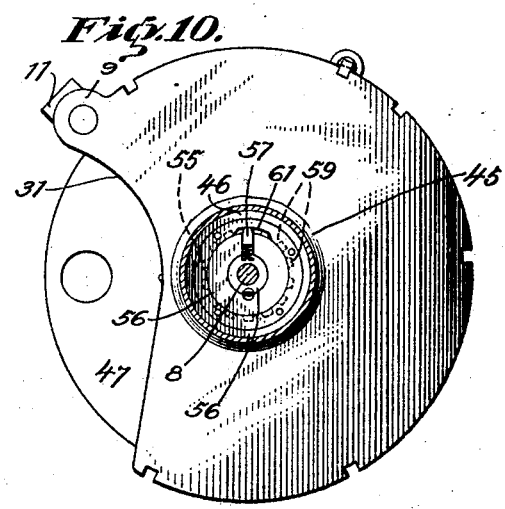
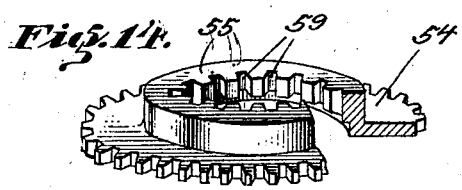
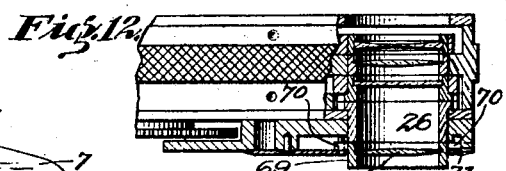
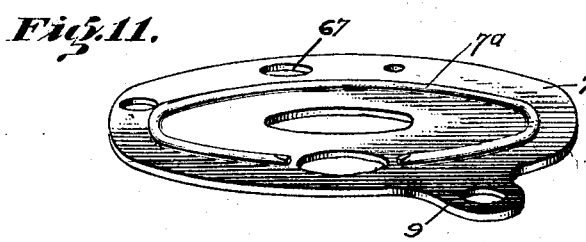
INVENTOR.
Clyde L. Hunsicker
BY
Townsend, Loftus & Abbett
ATTORNEYS.

Patented May 12, 1931

1,804,690

UNITED STATES PATENT OFFICE

CLYDE L. HUNSICKER, OF SAN FRANCISCO, CALIFORNIA, ASSIGNOR, BY MESNE ASSIGN-
MENTS, OF ONE-HALF TO AARON S. GREEN AND LOUIS D. GREEN

OPTOMETRIST INSTRUMENT

Application filed October 25, 1926. Serial No. 143,853.

This invention relates to optical instruments, and more especially to an opthalmological instrument for use in testing eyes for fitting lenses thereto. I am aware that such instruments are not broadly new, and that various forms thereof have heretofore been constructed and used. The primary object of my invention is to provide an improved instrument for that purpose which is more compact and efficient than such instruments heretofore known.

Instruments of this nature comprise a cylindrical lens system and a spherical lens system. The purpose of the cylindrical lens system is to determine and measure astigmatism of the eyes and the purpose of the spherical lens system, which cooperates with the cylindrical lens system, is to test the refractive errors of the eyes for hypermetropia or myopia. The cylindrical lens system embodies a plurality of lenses of different strength and means for rotatably adjusting the lenses. The spherical lens system embodies a plurality of lenses of different strength and other lenses of different strength adapted to cooperate therewith in different combinations whereby to obtain a large number of spherical lens combinations, all varying in strength in a progressive manner.

Heretofore the cylindrical and spherical lens systems as just described above have been embodied in rather large and cumbersome mechanism. In my improved instrument I rotatably mount a main cylindrical lens-carrying disk and a main spherical lens-carrying disk on a stud extending between the two cover plates on the instrument. Co-operating with the spherical lens-carrying disk, and preferably rotatably mounted directly thereon, are a plurality of planet disks carrying spherical lenses. All these spherical lenses are progressively adjustable to their various co-operating positions.

One of the main objects of my invention is to obtain a wider range of combined lens power, which will cover all the requirements of eye-testing without superimposing too many lenses together, which leads to telescopic effects and resultant errors of prescription.

In the present instrument the various spherical lenses powers range from 0 to +20.75 diopters, and from 0 to −35.00 diopters, without superimposing more than two lenses together. Prior instruments obtain a more limited range by superimposing from 3 to 5 lenses.

The range of my instrument covers 99½% of all cases without superimposing more than two spherical lenses, and provision can be made for an accessory lens (either spherical or cylindrical) which may be used to cover the extremely rare cases where a higher lens-testing power may be required.

Also the cylindrical lens system covers a power range likewise adequate to nearly all cases without any superimposing whatever.

Another object of my construction is to bank superimposed lenses so closely together as to nearly touch, thereby reducing telescopic effects.

Another object of my invention is to provide an improved controlling and adjusting mechanism for the cylindrical lens system. This mechanism embodied an interrupted gear arrangement so co-operating with the cylindrical lenses as to rotatably adjust the lenses being used, and at the same time block the other lenses of the system against rotation, this mechanism being confined very compactly in the instrument.

A further object of the invention resides in the provision of an automatic driving connection between the main and smaller disks of the spherical lens system whereby the lenses thereof are automatically brought into co-operating relation, this drive also embodying an intermittent driving arrangement hereinafter described. All these parts are also mounted compactly between the two cover plates.

It is a still further object of the invention to combine with the several parts of the instrument a more convenient arrangement of markings, whereby readings of the instrument may be taken more directly and conveniently than heretofore.

One form which my invention may assume is exemplified in the following specification, and illustrated in the accompanying drawings.

In such drawings, annexed hereto and forming a part of this specification, I have illustrated certain specific embodiments of my invention; but it will be understood that the invention can be otherwise embodied, and that the drawings are not to be construed as defining or limiting the scope of the invention, the claims appended hereto being relied upon for that purpose.

Referring to the figures of the drawings:

Figs. 8 and 9 are respectively transverse sectional views taken on lines VIII—VIII and IX—IX of Fig. 4.

Fig. 10 is a view taken on line X—X of Fig. 4.

Fig. 11 is a perspective view of the front plate.

Fig. 12 shows a detail sectional view of one of said tubes fitted with an auxiliary cylindrical lens.

Fig. 13 is a perspective view of ring operating movable tooth rotating sun gear.

Fig. 14 is a perspective view of sun gear for rotating major spherical lenses.

Fig. 15 is a perspective of the auxiliary cylindrical lens.

Figure 1:
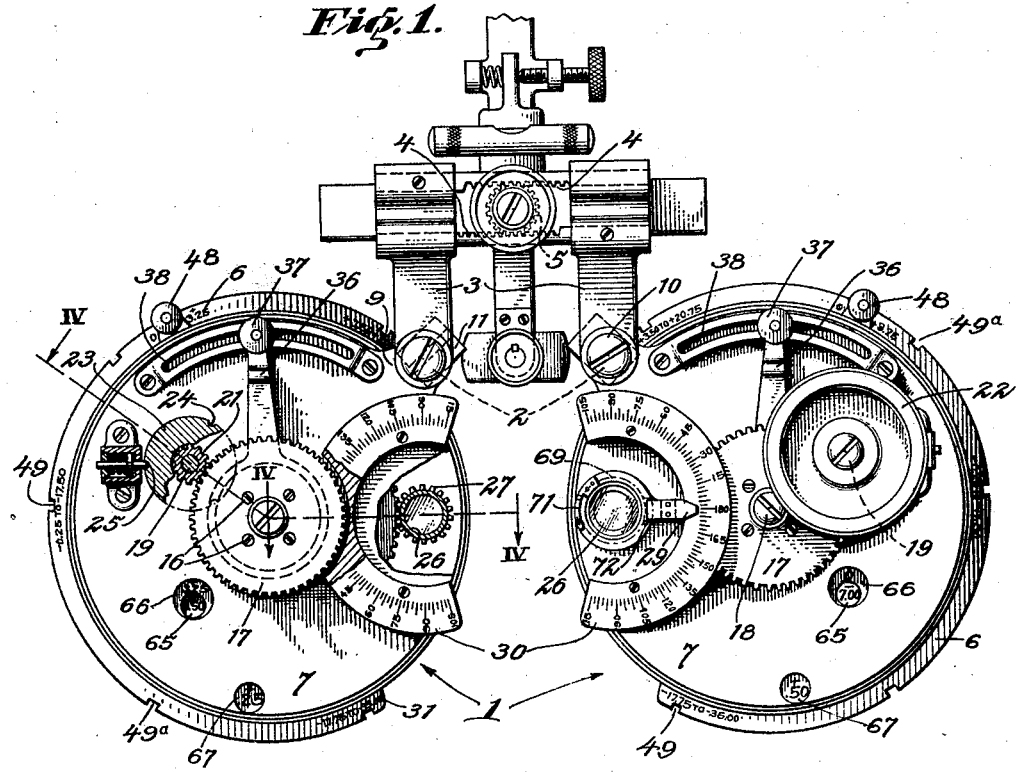
Fig. 1 is a front view of my improved instrument.
Figure 2:
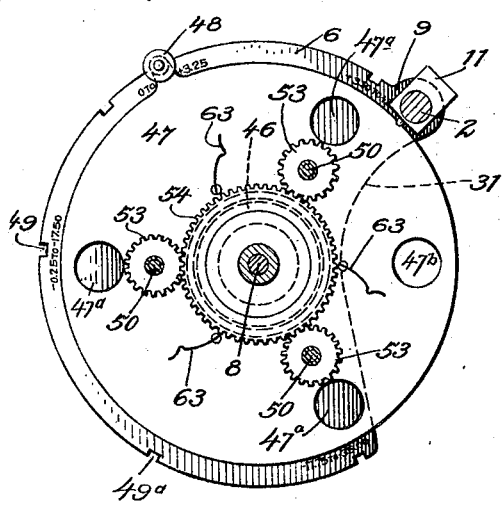
Figs. 2 and 3 are respectively transverse sectional views taken on lines II—II and III—III of Fig. 4.

As illustrated in Fig. 1 of the drawings, the instrument comprising my invention embodies two right and left lens-holding members 1, each carried on a bolt 2 supported on a depending lug 3. The two lugs 3 are respectively carried by a pair of racks 4 engaging opposite sides of the pinions 5. The members 1 can be adjusted laterally by rotating this pinion. The two members 1 being identical (except that one is right and the other left), a description of one such member will suffice.

Figure 7:
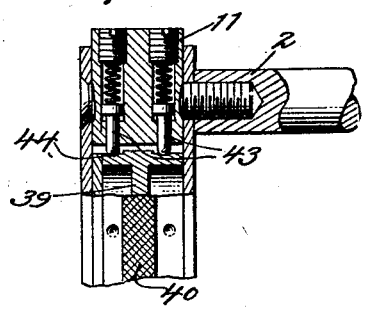
Fig. 7 is a detail view showing spring pressed detents acting on the main spherical lens disk.
Figure 6:
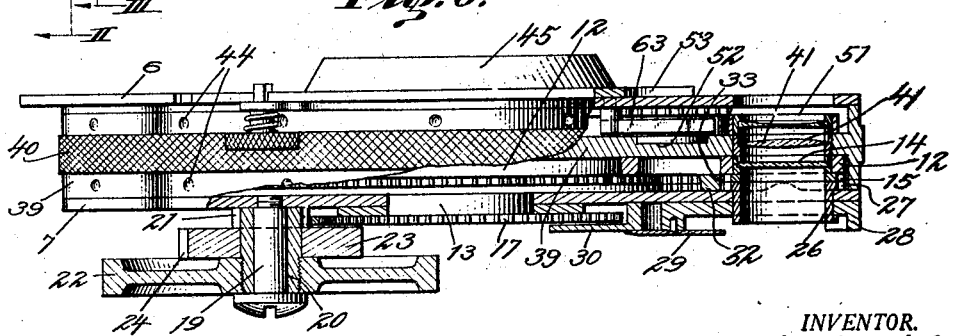
Fig. 6 is a plan view, partially in section, of one side of the instrument.

Each member 1 comprises a back cover plate 6 and a front cover plate 7. A stud 8 secured to the center of the back plate extends forwardly thereof and serves as an axle on which the main lens-carrying disks of the cylinder and spherical lens systems are mounted. The front and back plates are provided with two perforated ears 9 in alignment, and each member 1 is secured to its bolts 2 by a screw 10 engaging through these perforations and a block 11 as best shown in Fig. 7.

Cylindrical lens system

The large cylindrical lens-carrying disk, indicated by the numeral 12, is rotatably mounted on the stud 8, and includes a forwardly extending hub 13 integral with the disk. A plurality of cylindrical lenses 14 of graduated strength are rotatably mounted in this disk, concentric therearound. Each cylindrical lens is held in place by a member having pinion teeth 15 projecting beyond the disk forwardly thereof. Secured to the front face of the hub 13 by screws 16 is a gear 17 rotatably held on the stud 8 by a screw 18. A stud 19 carried by the front plate 7 has a sleeve 20 rotatably mounted thereon, and pinion teeth 21 in mesh with the gear 17. The sleeve can be rotated in a manner rotating the gear 17 and disk 12 by a knob 22 carried on the outer end of the sleeve. A disk 23 on the sleeve has three depressions 24 in its periphery, adapted to be engaged by a spring-pressed detent 25 for holding the disk 12 in its rotatably adjusted position. The depressions 24 are so spaced that when engaged by the detent one of the lenses 14 will be in alignment with the sight tube 26.

The sight tube 26 is rotatably mounted in the front plate 7 and has pinion teeth 27 on its inner end. The outer end of the tube carries a member 28 having a pointer 29 movable over a scale 30 as the tube is rotated. The back plate 6 is cut away at 31 opposite the tube 26. A disk or interrupted gear 32 rotatably mounted on the hub 13 has a segment 33 of its periphery formed with gear teeth adapted to engage both the pinion teeth 15 and pinion teeth 27. As shown in Fig. 9, the pinion teeth 15 of each cylindrical lens-holding member are interrupted at one position in a manner permitting the peripheral portion 34 of the disk 32 to engage the members and lock the same against rotation. The disk 32 therefore serves to hold all the members against rotation which are not engaged by the teeth 33. An arcuate opening 35 is formed in the disk 32 to permit readings therethrough as hereinafter described. The disk 32 may be rotated by a handle 36 secured thereto and having a spring-pressed knob 37 at its end engaging an arcuately slotted plate 38.

It will be seen that the gear teeth 33 engage the three lens-holders adjacent the sight tube 26. The disk 12 can be rotated by the knob 22 to bring any desired lens into alignment with the sight tube, and this lens can be rotated to the desired angle by the handle 36. This last rotation is recorded by the pointer 29, since the teeth 33 engage both pinion teeth 15 and 27.

Spherical lens system

The spherical lens system comprises first a main lens-carrying disk 39 rotatably mounted on the stud 8 and having a relatively knurled periphery 40, the sides of which act as the peripheral cover to the instrument. A plurality of spherical lenses 41 are mounted in this disk concentrically therearound, in a position adapted to be brought into alignment with the sight tube 26.

The lenses 41, which for convenience may be termed "minor" lenses, are of graduated strength, and are adapted to be brought successively into register with the sight tube 26. This disk can be rotated by hand engagement with the knurled periphery 40. A pair of spring-pressed detents 43 carried in each block 11 are adapted to engage in depressions 44 in the disk periphery and hold the disk in positions aligning its lenses with the sight tube 26.

The back plate 6 has a hub portion 45 within which rotatably fits the hub 46 of a plate 47. This plate carries a detent knob 48 for rotatably adjusting the plate and for locking the same in adjusted position by engaging the detent in notches 49 in the edge of the back plate.

Three inwardly projecting studs 50 are carried by the plate 47, and a planetary lens-carrying disk 51 is rotatably mounted on each such stud. Each of these disks 51 is fitted with a series of spherical lenses 42, of graduated strength. Being of greater strength and coarser graduation than lenses 41, I term them "major" lenses. The inner end of each stud engages in a guiding recess 52 formed concentrically in the adjacent face of the disk 39. A planetary pinion 53 on each stud is secured to each disk 51, and these three pinions are in mesh with a sun gear 54 having a hub portion 55 engaging within the hub 46.

A hub 56 carried by the disk 39 has a radially movable tooth 57 therein, normally spring-pressed outwardly by a spring 58. The inner wall of the hub 55 is provided with a series of recesses 59 adapted to receive the tooth 57. A ring 60 non-rotatably mounted adjacent the hub 55 has a recess 61 therein opposite the recessed portion of the hub 55. During most of the rotation of the disk 39 and its hub 56, the tooth 57 is held out of the recesses 59 by its engagement with the inner edge 62 of the ring 60. When the tooth comes to the recess 61 it drops thereinto and also into the recess 59 aligned therewith in a manner rotating the ring gear 54. This movement of the ring gear 54, however, continues only the distance between two adjacent recesses 59, since the tooth is forced inwardly as it passes away from the recess 61. The gearing ratio is such that this movement rotates the planetary lens disks 51 one-fifth rotation bringing the next lens thereof into co-operation with the sight tube 26. A spring detent 63 is provided for each disk 51 and engages in notches 64 therein for holding the disks in their adjusted and lens-aligning positions.

It will be seen from the foregoing that there are three lens-carrying disks two of them fitted with spherical lenses and the other fitted with cylindrical lenses. The disk 39 carries a series of spherical lenses ranging in strength from 0 to +3.25 diopters. The disk 47 carries three planetary disks 51, each of which carries a series of spherical lenses having a differential value of 3½ diopters, the operation being such that near the end of each revolution of the disk 39, the planet disks will be turned a space corresponding with the distance between two adjacent lenses. One of these planet disks carries lenses ranging from +3.50 diopters to +17.50 diopters. The other two planet disks carry lenses ranging from −3.50 diopters to −35.00 diopters. The disk 39 serves as a means for adjusting and combining all of the spherical lenses. It is rotated by grasping the knurled periphery 40, and any one of the lenses thereon can readily be brought into register with the sight tube. The markings for the lenses on this disk have to be read through a peep-hole 66, and hence are so placed that when the lens of 0 strength is aligned with the sight tube, the 0 reading on the disk will be visible through the peep-hole to one side of the sight-tube.

Figure 3:
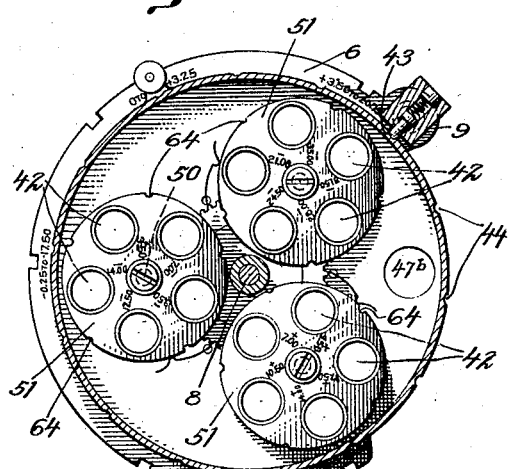
Figure 4:
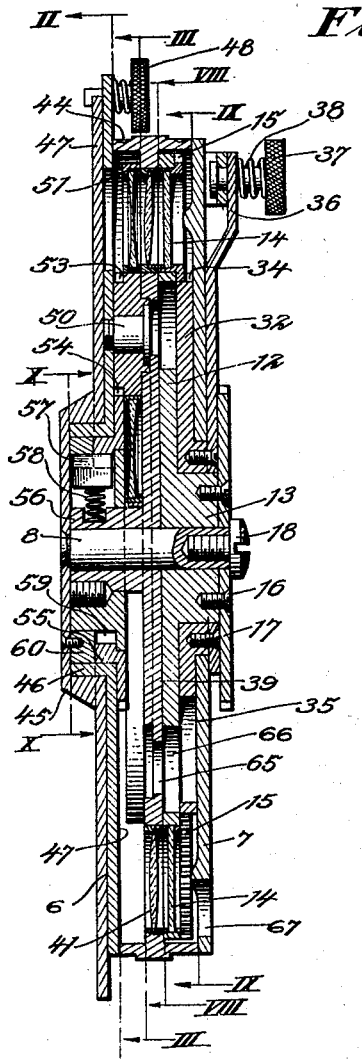
Fig. 4 is a longitudinal sectional view taken on line IV—IV of Fig. 1.
Figure 5:
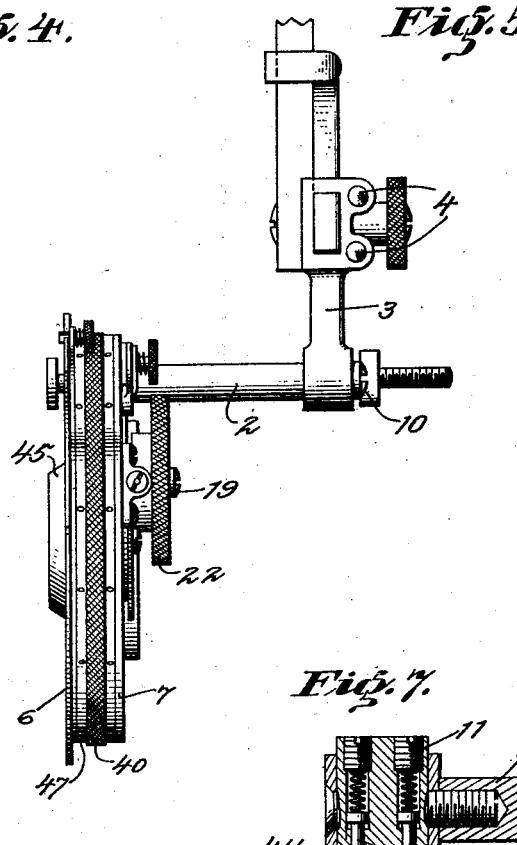
Fig. 5 is a side elevation of Fig. 1.

The disk or plate 47 can be turned on its own axis by releasing the detent knob 48 so as to bring the desired planet disk into juxtaposition with the sight-tube. Having so positioned the desired planet disk, then the rotation of the said planet disks on their own axes results from a continued rotation of the disk 39. At the end of each revolution of the said disk 39 the tooth 57 enters the recess 61 and moves the sun gear 54 a sufficient distance to impart rotation to the planetary pinions 53, such rotation being limited, however, to a distance corresponding to the space between two lenses on the disks 51. The markings for the lenses on the disks 51 are read through the peep-hole 65, and these markings likewise have to be spaced with relation to the lenses, as will be seen in Fig. 3.

In using the spherical lens system, and assuming that a lens with a strength of +3.50 diopters on one of the planetary disks is in register with the sight tube, then the operator rotates the disk 39 so as to bring successively into register with the sight tube, the various lenses thereon which have a maximum strength of +3.25 diopters. Should the combined strength, amounting to +6.75 diopters, be found to be insufficient, then a further movement of the disk 39 will permit the tooth 57 to enter the recess 61, and actuate the sun gear and planet pinions so as to rotate the planet disks a distance corresponding to the space between adjacent lenses thereon, thus bringing a lens into register with the sight tube having a strength of +7.00 diopters, at which time the lens of 0 value on the disk 39 will be in register with the sight tube. Continued rotation of the disk 39 will successively bring each of the lenses thereon into combination with the lens of +7.00 strength, and at the end of the revolution, if the desired effect has not been reached, another lens on the planetary disk of +10.50 diopters will be brought into register. Thus it will be seen that the adjustment of the spherical lenses is a progressive one, and that a wide range is possible by reason of the fact that any one of the several lenses on the disk 39 can be combined with each of the lenses on the planetary disks. In the particular arrangement illustrated, something over 200 different combinations of spherical lenses is possible.

The cylindrical lens system has two adjustments, the first of which is to align the desired lens with the sight tube, which is accomplished by rotating the disk 12 through the knob 22. The second adjustment is to rotate the selected lens on its individual axis so as to place the lens at the desired angle. This is done by moving the handle 36, which, through the interrupted gear 32, will turn the selected lens through substantially 210°. The markings for these cylindrical lenses are placed on the disk 12, and so spaced with relation to the lenses that when a lens is aligned with the sight tube, its mark may be seen through a peep-hole 67 in the front plate 7. These readings as here shown consist of values from 0 to +3.00 diopters. The interrupted gear through the pinion 27 will move the pointer 29 so as to indicate on the scale 30 the axis of the lens. This scale is so graduated as to show the various angles from 15° to 180° on the one half, and from 0 to 105° on the other half.

The sight tube 26 may be fitted with an auxiliary cylindrical or spherical lens 68, which is carried in a ring 69 removably received in the front end of the tube. This auxiliary lens is held in fixed position by means of lugs 70 thereon, one lying beneath the pointer 29 and the other lying beneath a spring 71. A stop pin 72 retains the lens in fixed position, and since the sight tube is turnable with the cylindrical lenses, the auxiliary lens 68 will always be in proper axial adjustment, corresponding with the axial adjustment of the cylindrical lens aligned with the sight tube.

In practice the cylindrical lenses are usually adjusted axially before selecting the desired strength of lens. Only the cylindrical lenses adjacent the sight tube at the time of setting the axis indicator will be rotated, the others being held against rotation by the smooth peripheral portion 34 of the disk 32. However, as the lens-carrying disk 12 is rotated to bring the entire lens into alignment with the sight tube, the newly positioned lens will automatically assume the proper axial position, by virtue of the gear segment 33. By thus limiting the number of cylindrical lenses which are axially rotated at one time, less effort is required to manipulate the axis indicator. Also less effort is required to turn the knob 22.

The disk 47 is provided with three openings 47ª, one adjacent each planetary disk 51, which openings are adapted to be aligned with the sight tube when the lenses on said planetary disks are in use. There is a fourth opening 47ᵇ which aligns with the sight tube when the planetary disks are not in use and only the lenses on the disk 39 are in use. At other positions of the disk 47 the sight opening will be obstructed.

The notches 49 are occupied by the knob 48 when the disk 47 in position to align one of the openings 47ª and associated planetary disk with the sight tube. There are intermediate notches 49ª which represent a closed position of the disk 47 when none of the openings therein will be aligned with the sight tube. This is for the purpose of rendering one unit inoperative, while using the other. The notches 49 are appropriately marked, according to the power of the various lenses which can be combined when the knob 48 is in that particular notch. For example, the notch which aligns the plus lenses is numbered +3.50 to +20.75, since this is the maximum power when the plus lenses on the disk 39 are added with the plus lenses on the planetary disk 51. One of the notches representing the position of the lower minus lenses is marked 0 to −17.50, and the one representing the position of the higher minus lenses is marked −17.75 to −35, these being the maximum effect when the plus lenses on the disk 39 are combined with the minus lenses on the disks 51.

The initial adjustment is to place the knob 48 in a notch where opening 47ᵇ will be aligned with a sight tube, as shown in Fig. 1, and to place the disk 39 at its 0 reading. Thereafter, if the first revolution of the disk 39, representing the lenses from 0 to +3.25, does not answer the requirements, then the knob is advanced to the notch 49, carrying the reading +3.50 to +20.75 (assuming that plus lenses are required). On the other hand, if minus lenses be required, then the knob 48 should be set in the notch carrying the reading 0 to −17.50, and later advanced to the higher minus position if necessary.

It will be noted that the plate 7 is provided with a circular bead 7ª, adapted to contact with the gears 15 carrying the cylindrical lenses, and thereby to maintain them in position upon the disk 12. This is a simple and convenient manner of removably retaining said gears in place, and reducing friction.

Having thus described my invention, what I claim as new and desire to secure by Letters Patent is:

1. In an optical instrument of the character mentioned, a rotatably mounted support fitted with a series of minor lenses of graduated strength, a second rotatable support, a plurality of planetary members on said second rotatable support, each fitted with a plurality of major lenses of graduated strength, and means for turning the planetary members one lens space upon each complete revolution of the minor lens-support.

2. In an optical instrument of the character mentioned, a rotatable disk fitted with a series of minor lenses of graduated strength, a sight tube through which said lenses are adapted to successively register, a second rotatable disk, a plurality of planetary members mounted on said second rotatable disk, a series of major lenses of graduated strength arranged on said planetary members, means to retain said second rotatable support in various positions where any one of said planetary members will be in juxtaposition with the sight tube, and intermittent gearing between said first-mentioned rotatable support and the planetary members, for turning the latter on their individual axes, one lens space at the completion of each revolution of the former.

3. In an optical instrument of the character mentioned, a rotatable disk fitted with a series of minor lenses of graduated strength, a sight tube through which said lenses are adapted to successively register, a second rotatable disk, a plurality of planetary members mounted on said second rotatable disk, a series of major lenses of graduated strength arranged on said planetary members, means to retain said second rotatable disk in various positions where any one of said planetary members will be in juxtaposition with the sight tube, planetary pinions on said planetary members, a sun gear with which said pinions mesh, and an intermittent clutch between the first-named rotatable support and the sun gear, whereby the latter is actuated at the end of each revolution of the former, a distance sufficient to turn the planetary members one lens space.

4. In an optical instrument of the character mentioned, a rotatable disk fitted with a series of minor lenses of graduated strength, a sight tube through which said lenses are adapted to successively register, a second rotatable disk, a plurality of planetary members mounted on said second rotatable disk, a series of major lenses of graduated strength arranged on said planetary members, means to retain said second rotatable disk in various positions where any one of said planetary members will be in juxtaposition with the sight tube, planetary pinions on said planetary members, a sun gear with which said pinions mesh, and an intermittent clutch between the first-named rotatable support and the sun gear, whereby the latter is actuated at the end of each revolution of the former, a distance sufficient to turn the planetary members one lens space, said clutch comprising a spring-pressed tooth on the hub of the first-mentioned rotatable disk, and a stationary cam to maintain said tooth out of engagement with the tooth on the sun gear during all but a short period near the end of the revolution of the said disk.

5. In an optical instrument of the character mentioned, a rotatable support, a series of toothed wheels, each with a smooth segment rotatably mounted on the support, cylindrical lenses of graduated strength carried by said toothed wheels, a sight tube through which said lenses may be registered successively by turning the support, and an oscillatable disk having a smooth segment and a toothed segment on its periphery, the latter being disposed so as to co-operate with the toothed wheel on the lens aligned with the sight opening, whereby the lens may be rotated in either direction on its own axis by oscillating the disk.

6. In an optical instrument of the character mentioned, a rotatable support, a series of toothed wheels, each with a smooth segment rotatably mounted on the support, cylindrical lenses of graduated strength carried by said toothed wheels, a sight tube through which said lenses may be registered successively by turning the support, an oscillatable disk having a smooth segment and a toothed segment on its periphery, the latter being disposed so as to co-operate with the toothed wheel on the lens aligned with the sight opening, whereby the lens may be rotated in either direction on its own axis by oscillating the disk, a pointer actuated by said oscillatable disk, and a scale co-operating therewith, to indicate the angular position of the lens.

7. In an optical instrument for the purposes mentioned, a housing consisting of front and back cover plates, a disk rotatably mounted between and having its periphery exposed for engagement by the hand, a series of spherical lenses of minor graduations arranged on said disk, a sight tube with which said lenses are adapted to register successively, a second disk rotatably mounted between said cover plates, planetary devices on said second disk, a series of spherical lenses of major graduations arranged on said planetary devices and adapted to be brought into register with said sight tube, means for rotating and retaining said second disk in various positions to dispose any one of said planetary devices adjacent the sight tube, and peripheral connections between the first disk and the planetary devices, whereby at the end of each revolution of the disk the planetary devices will be moved one lens space.

8. In an optical instrument for the purposes mentioned, a housing consisting of front and back cover plates, a disk rotatably mounted between and having its periphery exposed for engagement by the hand, a series of spherical lenses of minor graduations arranged on said disk, a sight tube with which said lenses are adapted to register successively, a second disk rotatably mounted between said cover plates, planetary devices on said second disk, a series of spherical lenses of major graduations arranged on said planetary devices and adapted to be brought into register with said sight tube, means for rotating and retaining said second disk in various positions to dispose any one of said planetary devices adjacent the sight tube, peripheral connections between the first disk and the planetary devices, whereby at the end of each revolution of the disk the planetary devices will be moved one lens space, a third rotatable disk arranged between said cover plates, a series of cylindrical lenses of graduated strength carried by the last-mentioned disk and adapted to register successively with the sight tube, means for rotating said last-mentioned disk, and means for turning the lenses thereon axially when the same are disposed adjacent the sight tube.

9. In an optical instrument, a movable minor lens carrying member, a plurality of finely graded spherical lenses disposed on said member, a movable major lens carrying member, a group of coarsely graded lenses disposed on said latter member and having positive refractive powers, another group of coarse graded lenses disposed on said latter member and having negative refractive powers, mechanical means interconnecting both said members whereby upon rotation of said minor lens carrying member, the lenses of one of said groups will be brought into successive registry with a sight opening to be superposed with minor lenses, and means for manually shifting said major lens carrying member to bring either group of said coarsely graded lenses into registry with said sight opening.

10. In an optical instrument, a casing having a sight opening, a plurality of spherical lens carrying members disposed within said casing and carrying lenses of both positive and negative powers, manually operable means connected to all said members for bringing lenses into regular successive registry with said sight opening whereby the refractory power of the apparatus may be gradually changed, and manually operable means for selecting either a negative or a positive refractive power.

11. In an optical instrument, a casing having a sight opening, a disc disposed within said casing, a group of graded lenses of positive powers disposed upon said disc, another group of lenses of negative powers disposed upon said disc, manual means for angularly shifting said disc whereby either one or the other groups may be operably disposed with respect to the sight opening, and means for bringing the lenses of a group into successive registry with said opening, said last named means being operable exteriorly of the casing.

12. In an optical instrument of the character described, a casing having an opening, a support rotatably disposed within said casing, a series of rings rotatably mounted upon said support, cylindrical lenses of graduated strength arranged in said rings, a sight tube rotatably disposed within said opening with which said lenses may be registered successively by turning the support, an auxiliary cylindrical lens fixed within the sight tube with means for simultaneously rotating the sight tube and the cylindrical lens in alignment therewith for adjusting the said lenses axially.

13. In an optical instrument, a movable support, a series of ring gears mounted thereon, lenses of graduated strength carried by said gears, a sight tube with which lenses can be registered successively by movement of the support, an auxiliary lens fixed within said tube, a ring gear carried by the sight tube, and a gear arranged to simultaneously engage both the ring gear of a lens carried by the support registered with said tube and the ring gear carried by the tube whereby both last mentioned gears are rotated in unison.

14. In an optical instrument, a rotatable carrier having a series of minor lenses of graduated strength, a second movable carrier, a plurality of members mounted upon said second carrier and individually movable relative to the same, said members being each fitted with a plurality of major lenses of graduated strength, and means for moving said members one lens space upon each complete revolution of the minor lens carrier.

15. In a device of the class described, a casing having a sight opening, a lens adapted to be registered with said opening, gear means disposed within the casing for effecting axial rotation of said lens, a lever disposed exteriorly of the casing for effecting manual actuation of said gear means, a member secured to the casing and having an arcuate slot, means carried by said lever extending thru said slot, and means resiliently urging said last means into engagement with said member.

16. In an optometer, a casing having an opening extending therethrough, a tube rotatably journaled in said opening, indicia carried by the outer portion of said tube, a rotatable disc disposed within said casing, a plurality of ring gears carried by said member and adapted to be brought into successive registry with said opening, lenses carried by said ring gears, a center gear adapted to engage the ring gears and effect rotation of a registered ring gear, and teeth on the inner portion of said tube also engaging said center gear.

17. In an optometer, a rotatable lens carrying member, a plurality of circumferentially spaced ring gears rotatably mounted on said member, cylindrical lenses mounted in said rings, a center gear having its periphery in cooperative engagement with each of said ring gears, a casing having an opening with which said lenses are adapted to be brought into successive registry, said center gear having a major portion of its periphery blank and a minor portion toothed, said ring gears having a major portion of their periphery toothed to mesh with the teeth of the center gear and a minor portion blank, said blank portion serving to cooperate with the blank portion of the center gear, whereby upon rotation of said center gear relative to said lens carrying member, only certain lenses are rotated, said gear assembly being arranged with respect to the casing to permit rotation of the lens in registry with the casing opening.

18. In an optical instrument, a lens carrier supporting a plurality of major lenses of different strengths, a second carrier supporting a plurality of minor lenses of different strengths, means for successively aligning said minor lenses with one of said major lenses in a line of sight, automatic means controlled by said first mentioned means for periodically aligning other major lenses in the line of sight and means operable at will for aligning still other major lenses in the line of sight.

19. In an optical instrument, a lens carrier supporting a plurality of major lenses of different strengths, a second carrier supporting a plurality of minor lenses of different strengths, means for successively aligning said minor lenses with one of said major lenses in a line of sight, means operable automatically and controlled by said first mentioned means to successively align other of said major lenses in the line of sight and means independent of said first mentioned means for aligning still other major lenses in the line of sight.

20. In an optical instrument, a lens carrier supporting a plurality of major lenses of graduated strengths, a second carrier supporting a plurality of minor lenses of graduated strengths, means for successively aligning said minor lenses with one of said major lenses in a line of sight, means operable to interconnect said carriers during the interval required to align certain successive ones of said minor lenses for automatically substituting a different major lens for said one major lens and means for substituting other major lenses manually and at will.

CLYDE L. HUNSICKER.